Figure 1:
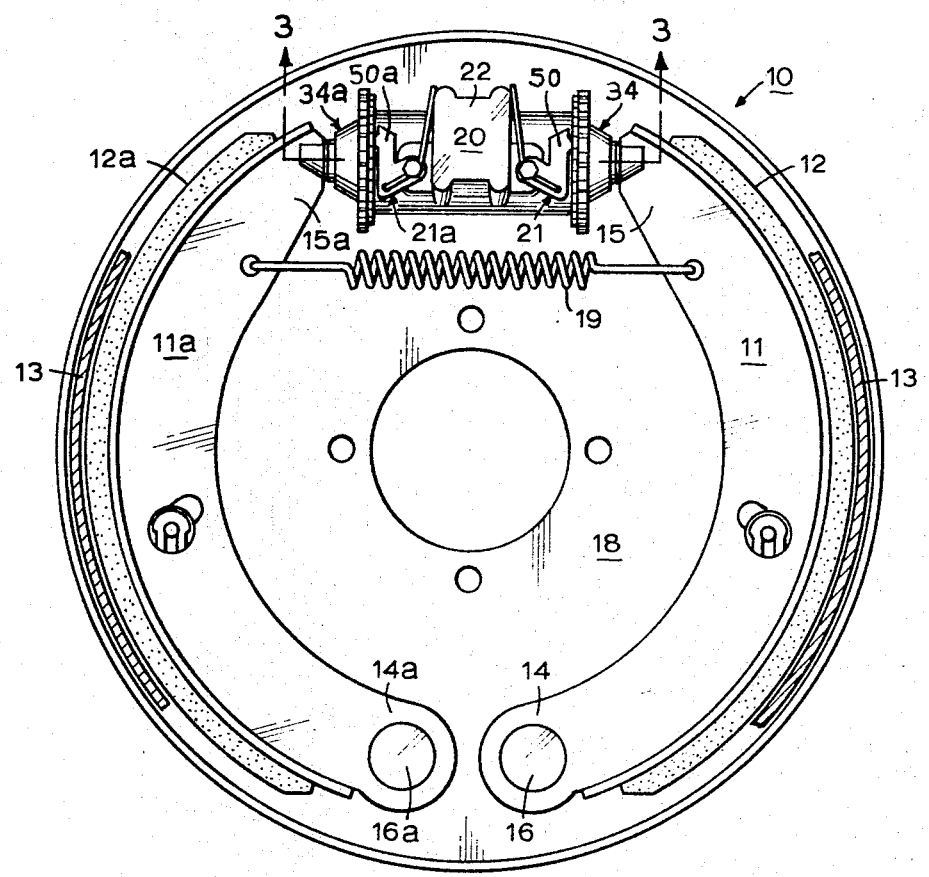

Oct. 18, 1966  G. F. CUSACK  3,279,565
ADJUSTMENT MECHANISM

Filed July 23, 1964  2 Sheets-Sheet 1

INVENTOR
GEORGE F. CUSACK
BY William R. O'Meara

Oct. 18, 1966  G. F. CUSACK  3,279,565
ADJUSTMENT MECHANISM
Filed July 23, 1964  2 Sheets-Sheet 2

INVENTOR
GEORGE F. CUSACK
BY William R. O'Meara

United States Patent Office 3,279,565
Patented Oct. 18, 1966

3,279,565
ADJUSTMENT MECHANISM
George F. Cusack, St. Louis County, Mo., assignor to Wagner Electric Corporation, St. Louis, Mo., a corporation of Delaware
Filed July 23, 1964, Ser. No. 384,639
17 Claims. (Cl. 188—79.5)

This invention relates to adjustment mechanisms and more particularly to an automatic adjusting mechanism cooperable with a movable member such as a friction member of an actuated friction device.

Automatic adjustment mechanisms are employed in friction devices to normally maintain a predetermined displacement between a movable friction member of the device and a cooperable friction producing element, such as a rotatable drum, in order to compensate for friction member wear occasioned by frictional engagement with the drum. In the past, such automatic adjustment mechanisms usually included an extendable link which predetermined the retracted position of the friction member, a rotary member having an irregular or sawtooth periphery and which was threadally engaged with the link to control the extension of the link, and a movable adjustor or lever having a detent portion resiliently urged into engagement with the sawtooth periphery of the rotary member and arranged to adjustably rotate the same in one direction to adjust the retracted position of the friction member when the friction member displacement exceeded a predetermined amount.

Some objectionable features of such mechanisms were that the movable adjustor was necessarily complicated in form and operation. In some cases, the mechanisms required resilient means to maintain the detent portion in engagement with the periphery of the rotary member and resilient means for effecting movement of the adjustor in response to displacement movement of the friction member. In certain prior art devices, special resilient means of sufficient force were required to provide the force necessary to rotate the rotary member.

Another objectionable feature of such automatic adjustment mechanisms was the difficulty in manually rotating the rotary member in the event of an overadjustment or in installing a new friction member because of the engagement between the detent portion of the adjustor and the sawtooth periphery of the rotary member. In such mechanisms it was necessary to undesirably deflect the adjustor out of engagement with the periphery of the rotary member in order to effect manual adjustment and, in some cases, it was necessary to use two tools, one tool to move the adjustor out of engagement with the rotary member and the other to rotate the rotary member. If the adjustment mechanism was designed such that the adjector was maintained out of engagement with the periphery of the rotary member when the friction member was in the retracted position there was usually danger of unwarranted or undesirable rotation of the rotary member due to vibrations, such as in the case of a vehicle traveling over road bumps and the like.

It is, therefore, an object of the present invention to provide an automatic adjustment mechanism which substantially overcomes the above-mentioned objectionable features and which is reliable and accurate in performance.

Another object of the present invention is to provide a novel automatic adjustment mechanism which is simple in construction and can be readily manually adjusted where desired without requiring special parts or additional tools.

Another object is to provide a novel automatic adjusting mechanism for a friction device having a movable adjustor with a detent portion and rotary member adapted to be rotated by the adjustor for adjusting the retracted position of a friction member wherein the detent portion is maintained out of driving engagement with the rotary member to permit manual rotation of the rotary member while, at the same time, the adjustor applies a retarding force to the rotary member during normal operations of the friction device to prevent any unwarranted rotation thereof.

Another object is to provide a novel automatic adjustment mechanism which includes a rotary member for adjusting the retracted position of a friction member of a friction device and which includes a lever for rotating the rotary member when an adjustment of the retracted position of the friction member is required and wherein the lever is especially simple and reliable in operation and relatively inexpensive.

These and other objects and advantages of the present invention will be apparent hereinafter.

Briefly, the present invention embodies adjustment means for predetermining the retracted position of a movable member and includes flange means movable to adjust the movable member, and adjustor means engageable with a side wall portion of the flange means in response to a predetermined movement of the movable member to move the flange means and adjust the retracted position of the movable member.

Figure 2:
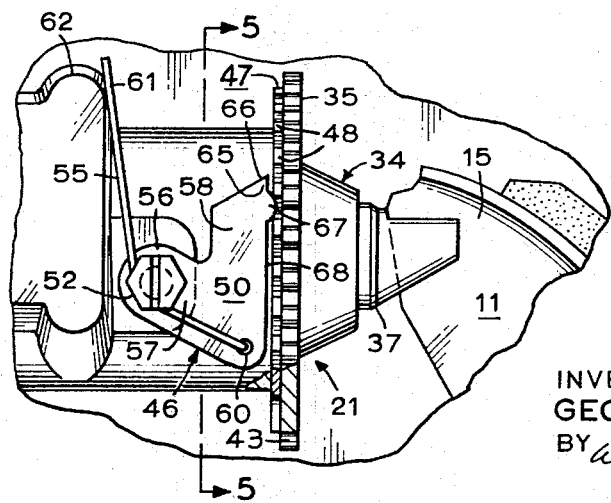
Figure 3:
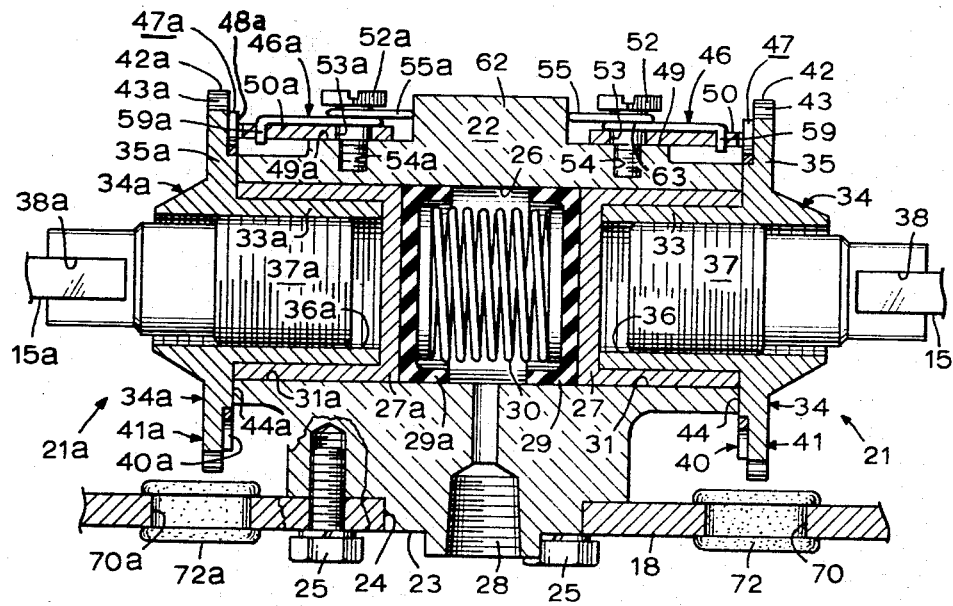
Figure 4:
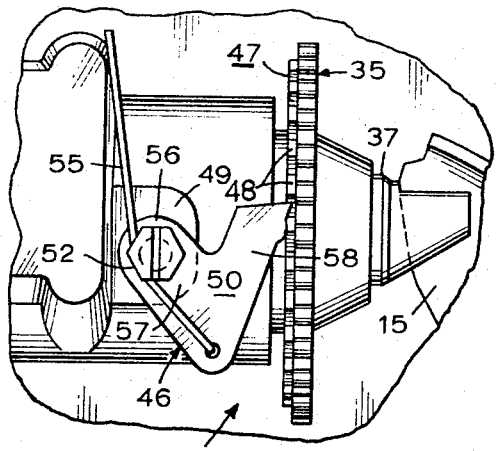
Figure 5:
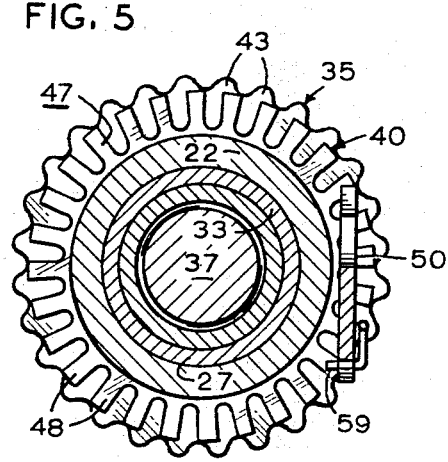

In drawings which illustrate embodiments of the invention,

FIGURE 1 is an elevational view of a friction device embodying the present invention, FIGURE 2 is an enlarged fragmentary view of FIGURE 1, FIGURE 3 is an enlarged sectional view taken along line 3—3 of FIGURE 1, FIGURE 4 is an enlarged fragmentary view of FIGURE 1 illustrating the friction device in its energized condition with one of the brake shoes in its maximum displacement position, and FIGURE 5 is a sectional view taken along line 5—5 of FIGURE 2.

Referring now to FIG. 1 of the drawings, there is shown for illustrative purposes a friction device or vehicle brake 10 which includes a pair of opposed radially displaceable friction members or brake shoes 11, 11a including friction material or linings 12, 12a for frictional engagement with a relatively rotatable friction element or drum 13, the brake shoes having opposed sets of adjacent ends 14, 14a, and 15, 15a. The adjacent or anchoring ends 14, 14a of the brake shoes are pivotally associated with spaced anchor members 16, 16a, respectively, disposed on a stationary backing plate or shield 18. A shoe return spring 19 is connected between the brake shoes 11, 11a normally urging the adjacent or displaceable ends 15, 15a into engagement with a fluid pressure responsive actuator motor or wheel cylinder 20 which includes automatic adjustment mechanisms, indicated generally at 21, 21a, for automatically controlling the retracted positions of the brake shoes 11, 11a, respectively, to maintain a predetermined clearance between each of the brake shoes and the drum 13.

Referring also to FIG. 3, the wheel cylinder 20 includes a housing 22 having an integral mounting portion 23 which protrudes through an opening 24 in the backing plate 18 and is rigidly secured to the backing plate by a plurality of fastening means, such as threaded studs 25. The cylinder housing 22 is provided with a bore 26 therethrough in which a pair of axially spaced force receiving members or pistons 27, 27a are slidably disposed. A pressure fluid inlet passage 28 extends through the housing mounting portion 23 in communication with the mid-portion of bore 26 between the opposed pistons 27, 27a. Sealing elements, such as cups 29, 29a are disposed in sealing engagement between the bore 26 and pistons 27, 27a, and a return spring 30 is biased between cups 29, 29a.

The pistons 27, 27a are provided with axially extending annular recesses 31, 31a, which rotatably and slidably receive sleeve portions 33, 33a of rotatable adjusting members or starwheel members 34, 34a of the automatic adjustment mechanisms 21, 21a, the sleeve portions 33, 33a having inner ends normally in abutting engagement with the pistons. The starwheel members 34, 34a also include radially extending annular flanges 35, 35a, on the outer or free ends of the sleeve portions 33, 33a, adjacent to the opposite ends of housing 22. The sleeve portions 33, 33a are provided with axially threaded recesses or bores 36, 36a which threadedly receive threaded extendable members or struts 37, 37a. The struts 37, 37a are provided with shoe guide slots 38, 38a at the outer or free ends thereof in which the adjacent shoe ends 15, 15a are vertically slidable and retained against lateral displacement, the shoe ends, in turn, preventing rotation of the struts.

The starwheel flanges 35, 35a have radially extending inner side walls, indicated generally at 40, 40a, radially extending outer side walls 41, 41a, and irregular peripheral surfaces 42, 42a. The peripheral surfaces 42, 42a are provided with circumferentially spaced grooves or notches 43, 43a, which serve to facilitate manual adjustment of brake shoes 11, 11a, respectively, as will be further discussed hereafter. The axially inner walls 40, 40a are provided with annular abutment surfaces or shoulders 44, 44a which respectively engage the opposite ends of housing 22 when the brake is de-energized.

The compressive force of the shoe return spring 19 normally urges the adjacent shoe ends 15, 15a into engagement with the shoe guide slots 38, 38a, which, in turn, serve to bias the flange shoulders 44, 44a into abutment with the opposite ends of housing 22, respectively, and the struts 37, 37a adjustably define the retracted positions of the brake shoes 11, 11a to maintain the displacement between the brake shoes and the drum 13 substantially constant within limits.

In accordance with the illustrated embodiment of the present invention, the brake shoes 11, 11a are automatically adjusted in response to displacement movement thereof in excess of a predetermined amount relative to the drum 13 to compensate for wear of the linings 12, 12a occasioned during frictional engagement with the drum 13. The above-mentioned automatic adjustment of shoes 11, 11a is accomplished by the automatic adjustment mechanisms 21, 21a which also include driving members or adjustors, indicated generally at 46, 46a, that are drivingly engageable with the inner side walls 40, 40a of flanges 35, 35a. The inner side walls 40, 40a of the flanges 35, 35a are provided with serrated driven members or starwheels 47, 47a fixedly connected to the flanges. The starwheels 47, 47a may be rigidly secured to flanges 35, 35a in any suitable manner for example, by wedging them over shoulders 44 and 44a or by use of suitable connecting pins or welding (not shown), or each may be formed as an integral part of its associated flange. The starwheels 47, 47a are provided with axially extending, circumferentially spaced, abutments or teeth 48, 48a. The teeth extend radially outwardly and are equally spaced apart, as will be apparent from FIG. 5 where the teeth 48 of flange 35 are more fully shown.

The adjustors 46, 46a include generally V-shaped levers 50, 50a, pivotally mounted on flat bearing surfaces 49, 49a of the cylinder housing 22, which is a stationary part of brake 10, by threaded pivot pins 52, 52a. The bearing surfaces 49, 49a are in planes which are substantially normal to the planes of the flanges 35, 35a and which intersect the starwheels 47, 47a. The adjustor levers 50, 50a are provided with mounting holes 53, 53a through which the pins 52, 52a extend, pins 52, 52a being threaded into threaded holes 54, 54a in the housing 22. The levers 50, 50a are biased or resiliently urged toward engagement with the side walls 40, 40a, respectively, by resilient means or adjustor springs 55, 55a. The levers are shown as simple flat members or punchings, each being pivotal in a single plane which is normal to the plane of the flange associated therewith, the plane of each lever intersecting its associated flange substantially chordwise thereof.

Since the adjustors 46 and 46a are identical to each other, as are all of the corresponding component parts of the adjusting mechanisms 21, 21a, only the adjustor 46 will be described herein in further detail.

As seen in FIG. 2, the pivot pin 52 extends through the upper or free end 56 of one of the arms, indicated at 57, of the V-shaped lever 50 with the lever being pivotable about the axis of the pin 52. The lever 50 is mounted on the cylinder housing 22 such that the other or driving arm thereof, which is indicated at 58, extends substantially parallel to the plane of the flange 35 or side wall 40, when the brake shoe 11 is in the retracted position, the brake shoe being shown in the retracted position in FIG. 2. The spring 55 is shown for illustration as a resilient wire spring having a bent end portion 59 extending into an opening 60 located at the bottom of the lever or at the junction of the arms 57 and 58, and with an opposite end portion 61 biased into engagement with an extension 62 of housing 22. The spring 55 is provided with a closed loop, indicated at 63 in FIG. 3, through which pivot pin 52 passes so as to anchor or maintain the spring in place on the housing 22 and such that the resiliency of spring 55 serves to bias or pivot the lever 50 about pivot pin 52 into following engagement with the side wall 40 of the flange 35, the lever urging the flange 35 toward the brake shoe. The driving arm 58 includes a driving or detent portion 65 at the free end thereof which has a driving or detent edge 66 adapted to drivingly engage a tooth 48 on the side wall 40 and rotate the flange 35 during an adjusting operation. The driving arm 58 is also provided with spacer or abutment means 67 shown as an integral portion of the driving arm 58 and which extends axially outwardly from the leading or right-hand side edge 68 of the driving arm 58 and is adjacent to the detent portion 65 at a predetermined distance from the detent edge 66. Detent edge 66 intersects side edge 68 at the outer corner of the arm 58. The abutment means 67 has a rounded outer edge surface which engages the teeth 48 of side wall 40 to maintain the detent edge 66 in an inoperable position axially spaced from any of the teeth 48 when the brake shoe 11 is in the retracted position as shown in FIG. 2. The pivot pin 52 and loop 63 of spring 55 serve to maintain the lever 50 against bearing surface 49 so that lever is pivoted in a single plane with the detent portion 65 and its detent edge 66 disposed radially inwardly of the outer periphery of the flange 35 and starwheel 47. The abutment means 67 is resiliently urged into engagement with the teeth 48 in the retracted position of shoe 11, as well as during normal energization and deenergization of the brake 10, to apply a force retarding rotation of flange 35, so as to prevent unwarranted rotation of the flange due to vibrations and the like. As seen in FIG. 2, the abutment means 67 extends into the space between two adjacent ones of the teeth 48 and engages these teeth to oppose unwarranted movement of flange 35 in either direction.

In order to illustrate the operation of the brake 10 and the adjusting cycle of the automatic adjustment mechanisms, it will be assumed that only the friction lining 12 is sufficiently worn to warrant an adjustment of the brake shoe 11 and that the components of the brake and automatic adjustment mechanisms are positioned as indicated in FIGS. 1 and 2, wherein each of the brake shoes is in the retracted position. Fluid pressure transmitted to bore 26 of wheel cylinder 20 through inlet passage 28 from a source of fluid pressure, such as a master cylinder or the like (not shown), acts on the effective areas of the sealing cups 29, 29a to establish an actuating force. The actuating force concertly moves or displaces the sealing cups 29, 29a, the pistons 27, 27a, the starwheel members 34, 34a, and the struts 37, 37a outwardly in the cylinder bore 26, whereby the brake shoes 11, 11a are radially displaced against the compressive force of the return spring 19 to urge the friction linings 12, 12a into frictional engagement with the rotatable drum 13 to thereby effect energization of the brake 10. The displacement movement of the brake shoe 11 exceeds the aforementioned predetermined amount while brake shoe 11a does not since it was assumed that an adjustment of only shoe 11 was necessary.

During the above-mentioned displacement movement of the brake shoe 11 in excess of the predetermined amount, the force of the spring 55 pivots the levers 50, 50a about pivot pins 52, 52a in opposite directions, whereby the levers follow the axial movements of the flanges 35 and 35a, respectively. This pivotal movement of lever 50 which is in the clockwise direction as viewed in the drawings, serves to pivot driving arm 58 so as to move the detent portion 65 from its position in FIG. 2 into an operable position wherein the detent edge 66 thereof is moved to a position between adjacent ones of the teeth 48, which is the position thereof shown in FIG. 4. As the driving arm 58 pivots from its inoperable position shown in FIG. 2, to its operable position shown in FIG. 4, in response to outward movement of flange 35, the abutment means 67 slides downwardly on one of the teeth 48 and the detent edge moves into the space between the above-mentioned adjacent teeth 48 from the axially inner side of the starwheel 47. Since the displacement movement of shoe 11a is less than the predetermined amount under these assumed conditions the lever 50a follows the movement of flange 35a but does not move into an operable position with the teeth of starwheel 47a.

When the brake 10 is deenergized, the fluid pressure in the wheel cylinder bore 26 is exhausted, eliminating the actuating force, and the compressive force of the shoe return spring 19 moves the shoes 11, 11a toward their original or retracted positions. This retractile movement of each of the shoes, in turn, moves the struts 37, 37a, the starwheel members 34, 34a, and the pistons 27, 27a inwardly in the bore 26 toward their original positions. Since the adjustor levers 50, 50a are biased into abutting or following engagement with the starwheel members 34, 34a, the return movement of each of the starwheel members 34, 34a pivots the levers 50, 50a in opposite directions to their original positions. This return pivotal movement of adjustor lever 50 effects pivotal movement of adjustor arm 58, whereby the edge 66 of detent portion 65 drivingly engages one of the adjacent teeth 48 on the side wall 40 or starwheel 47 and effects rotation of the starwheel member 34. Since strut 37 is held against rotation by the shoe 11, rotation of starwheel member 34 moves strut 37 axially outwardly in the threaded bore 36 of starwheel member 34 to adjust the retracted position of shoe 11. During this return pivotal movement of lever 50, the detent portion 65 drivingly engages a tooth 48 and rotates the starwheel member 34 as mentioned above, and then moves from driving engagement with that tooth and the starwheel member 34 back to its inoperable position out of engagement therewith, the lever being again in the position shown in FIG. 2. In this manner, the adjustable axial displacement of the strut 37 effectively moves the displaceable shoe end 15 from the fixed cylinder housing 22 to reposition the friction lining 12 closer to the drum 13 and thus maintains the normal displacement between the lining 12 and drum 13 substantially constant or within predetermined limits to compensate for lining wear. Under the above assumed conditions, the lever 50a will not effect an adjustment of shoe 11a.

Continued wear of the lining 12 will, of course, eventually result in furth adjustment of the shoe 11 by the automatic adjustment means 21 in the same manner hereinbefore described. The cooperation of component parts and operation of the adjustment mechanism 21a in adjusting the retracted position of shoe 11a when the displacement thereof exceeds a predetermined amount is identical with that described above in connection with the adjustment of the retracted position of shoe 11 by mechanism 21. During normal operation of the brake 10 when no adjustment is required, the levers 50, 50a pivot in response to the axial movements of the starwheel members 34, 34a, but the detent portions of the levers do not pivot a sufficient amount to move the detent portions into operable positions between adjacent teeth on the starwheel members or permit the detent portions of the levers 50 and 50a to drivingly engage any of the teeth of the starwheel members to effect rotation thereof.

The brake 10 may be manually adjusted, and for this purpose access opening 70, 70a are provided through the backing plate 18 substantially in alignment with the peripheral surfaces 42, 42a of the flanges 35, 35a; and resilient closure members 72, 72a are normally removably secured in the openings 70, 70a to prevent entry of any foreign material into the interior of the brake. Removal of the closure members 72, 72a permits the manual insertion of an adjusting tool, such as a screwdriver or the like (not shown), through the openings into manual engagement with the peripheral notches 43, 43a of the flanges 35, 35a. Since the detent portions of levers 50, 50a, as previously mentioned herein, are disengaged or axially spaced from all of the teeth 48, 48a when the brake shoes are in the retracted positions, the starwheel members 34, 34a are readily rotated in either direction by manually driving them by use of an adjusting tool. While the levers are resiliently urged into engagement with the starwheel members 34, 34a to retard rotation and prevent undesired rotation thereof, these retarding forces are easily overcome when manually adjusting the automatic adjustment mechanisms.

The adjustor levers 50, 50a are simple flat members, that is, without any bends, so that they may be economically punched from suitable sheet metal, and where desired or necessary, heat treated to the desired hardness. Since the driving or detent edges of the levers 50, 50a are normally out of engagement with the teeth of the starwheels 47, 47a during the normal operation of the brake, wear of the detent edges is minimized.

It will be apparent to those skilled in the art that the automatic adjusting mechanisms 21, 21a are not necessarily restricted for use with the particular type or geometric configuration of the friction device or brake shown and described herein for illustration. Further, while the fluid pressure responsive wheel cylinder 20 is shown and described in conjunction with the automatic adjusting mechanisms for purposes of illustration, it is apparent that other means such as cams, wedges, rollers, and the like, which are well known in the art, may be employed to impart the actuating force for energizing the friction device or brake.

From the foregoing it is now apparent that novel automatic adjusting means meeting the objects set out hereinbefore are provided and that changes or modifications as to the precise configurations, shapes or details of the construction set forth in the disclosure by way of illustration may be made by those skilled in the art without departing from the spirit of the invention as defined by the claims which follow.

The embodiments of the invention in which an exclusive property or privilege is claimed are defined as follows:

1. In a friction device having a friction member for displacement and retractile movement between a retracted position and a displaced position in frictional engagement with a coacting member, adjustment means movably supported by said friction device and engaged for concert movement with said friction member and engageable with a portion of said friction device to adjustably define the retracted position of said friction member, said adjustment means including flange means rotatable to adjust the retracted position of said friction member, said flange means including a peripheral portion, and a side wall portion having spaced abutment means, and resiliently urged means pivotally supported in said friction device for concert movement with said adjustment means and including a driving portion pivotal in a plane which intersects said side wall portion, said driving porton being drivingly engageable with said abutment means to rotate said flange means and adjust the retracted position of said friction member, and means on said resiliently urged means engaging said flange means to maintain said driving portion axially spaced from said abutment means when said friction member is in the retracted position.

2. In a friction device having a friction member for displacement and retractile movement between a retracted position and a displaced position in frictional engagement with a coacting member, adjustment means movably supported by said friction device for concert movement with said friction member and engageable with a portion of said friction device to adjustably define the retracted position of said friction member, said adjustment means including flange means rotatable to adjust the retracted position of said friction member, said flange means including a peripheral surface, and a radially extending side wall portion having spaced abutment means, and adjustor means pivotally supported in said friction device and resiliently urged toward engagement with said adjustment means for concert movement with said adjustment means and including a driving portion pivotal in a plane which intersects said side wall portion, said driving portion being movable from an inoperable position wherein said driving portion is disposed radially inwardly of said peripheral surface and axially spaced from said side wall to an operable position wherein said driving portion is disposed in the space between adjacent ones of said abutment means, said driving portion being movable from said operable position into driving engagement with one of said adjacent abutment means to rotate said flange means to thereby adjust the retracted position of said friction member.

3. In a friction device having a friction member for displacement and retractile movement between a retracted position and a displaced position in frictional engagement with a coacting member, adjustment means movably supported by said friction device for concert movement with said friction member and engageable with a portion of said friction device to adjustably define the retracted position of said friction member, said adjustment means including an adjusting member rotatable to adjust the retracted position of said friction member, said adjusting member including annular flange means with circumferentially spaced abutments at the periphery thereof adapted to be engaged by a tool for manually adjusting said adjustbent means, and a radially extending side wall portion having circumferentially spaced axially extending abutment means thereon, and adjustor means pivotally supported in said friction device and resiliently urged into engagement with said adjustment means for concert movement with said adjustment means, said adjustor means including a driving portion drivingly engageable with said axially extending abutment means to rotate said flange means and adjust the retracted position of said friction member, and means on said resiliently urged means engaging said flange means to maintain said driving portion axially spaced from said abutment means when said friction member is in the retracted position to permit said manual adjustment of said adjustment means.

4. In a friction drive having a friction member for displacement and retractile movement between a retracted position and a displaced position in frictional engagement with a coacting member, adjustment means movably supported by said friction device and engaged for concert movement with said friction member and engageable with a portion of said friction device to adjustably define the retracted position of said friction member, said adjustment means including an adjusting member rotatable to adjust the retracted position of said friction member, said adjusting member including an annular flange with circumferentially spaced abutments at the periphery thereof adapted to be engaged by a tool for manually rotating said adjusting member to adjust the retracted position of said friction member, and a starwheel member connected to one side of said flange and having circumferentially spaced radially extending teeth, and automatic adjustor means pivotally supported in said friction device and resiliently urged into engagement with said adjustment means for concert movement therewith and including a driving portion pivotal in a plane which intersects said starwheel member, said driving portion being drivingly engageable with one of said teeth in response to a predetermined displacement movement of said friction member to rotate said flange and automatically adjust the retracted position of said friction member, and spacer means on said adjustor means engaging said flange to maintain said driving portion axially spaced from said teeth when said friction member is in the retracted position to permit manual rotation of said adjusting member.

5. In a friction device having a friction member for displacement and retractile movement between a retracted position and a displaced position in frictional engagement with a coacting member, adjustment means movably supported in said friction device for concert movement with said friction member and engageable with a portion of said friction device to adjustably define the retracted position of said friction member, said adjustment means including flange means rotatable to adjust the retracted position of said friction member, said flange means including a peripheral surface, and a side wall portion having axially extending circumferentially spaced abutments, and adjustor means pivotally supported in said friction device and resiliently urged into engagement with said flange means for concert movement with said adjustment means, said adjustor means including a driving portion disposed radially inwardly of said peripheral surface and drivingly engageable with said abutments for rotating said flange means to adjust the retracted position of said friction member, and abutment means on said adjustor means maintaining said driving portion in an operable position wherein said driving portion is axially spaced from said abutments when said friction device is in a retracted position, said driving portion being movable from said inoperable position into an operable postion wherein said driving portion is disposed between adjacent ones of said abutments in response to the displacement movement of said friction member in excess of a predetermined amount, said driving portion being movable from said operable position into driving engagement with one of said adjacent abutments in response to retractile movement of said friction member to rotate said flange means and thereby adjust the retracted position of said friction member.

6. In a friction device having a friction member for displacement and retractile movement between a retracted position and a displaced position in frictional engagement with a coacting member, adjustment means movably supported in said friction device for concert movement with said friction member, including a flange member engageable with a portion of said friction device and a strut adjustably coupled to said flange member and engaging said friction member to adjustably define the retracted position of said friction member, said flange member being rotatable relative to said strut to adjust the retracted position of said friction member, said flange member including a radially outer peripheral surface, and a radially extending side wall portion having axially extending circumferentially spaced abutments, adjustor means pivotally supported in said friction device for concert movement with said flange member and including a driving portion and abutment means, resilient means urging said driving portion and abutment means toward engagement with said flange member, said driving portion being drivingly engageable with said abutments for rotating said flange member to adjust the retracted position of said friction member, said abutment means engaging said flange member to maintain said driving portion in an inoperable position wherein said driving portion is spaced axially inwardly from said abutments and radially inwardly of said peripheral surface when said friction device is in a retracted position, said driving portion being movable from said inoperable position into an operable position wherein said driving portion is disposed between adjacent ones of said abutments in response to the displacement movement of said friction member in excess of a predetermined amount, said driving portion being movable from said operable position into driving engagement with one of said adjacent abutments in response to retractile movement of said friction member to rotate said flange member and thereby adjust the retracted position of said friction member.

7. In a friction device having a pair of relatively displaceable friction members, one of said friction members being adapted for displacement and retractile movement into and out of frictional engagement with the other of said friction members, extendable adjustment means mounted in said friction device for concert displacement and retractile movement with said one friction member and defining the retracted position thereof including a wheel member rotatable to control the extension of said adjustment means and adjust the retracted position of said one friction member, said wheel member having a radially extending side wall portion with radially extending circumferentially spaced teeth, adjustor means pivotally supported on said friction device and resiliently urged into following engagement with said side wall portion to effect pivotal movement of said adjustor means in one direction in response to displacement movement of said adjustment means, said adjustor means including driving means engageable with said teeth for rotating said wheel member, and abutment means engaging said side wall portion to maintain said driving means in an inoperable position with respect to any of said teeth when said one friction member is in a retracted position, said driving means being pivotal with said adjustor means in said one direction into an operable position between two adjacent ones of said teeth in response to a predetermined amount of displacement movement of said adjustment means and pivotal with said adjustor means in the opposite direction into driving engagement with one of said adjacent teeth in response to retractile movement of said adjustment means to rotate said wheel member and extend said adjustment means to adjust the retracted position of said one friction member.

8. In a friction device having a friction member for displacement and retractile movement between a retracted position and a displaced position in frictional engagement with a coacting member adjustment means movably supported by said friction device for concert movement with said friction member and engageable with a portion of said friction device to adjustably define the retracted position of said friction member, said adjustment means including flange means rotatable to adjust the retracted position of said friction member, said flange means including a radially extending side wall portion having axially extending spaced abutments, and adjustor means including a lever pivotally mounted on a fixed portion of said friction device for pivotal movement in a plane which intersects said side wall portion, said lever including a follower arm having a driving edge at one end thereof adapted for driving engagement with said abutments for rotating said flange means, and spacer means adjacent to said driving edge and extending from said arm toward said flange means, and resilient means connected to said arm adjacent to the opposite end thereof to normally urge said opposite end away from said flange means and said spacer means against said flange means, said spacer means engaging said flange means to maintain said driving edge axially spaced from said abutments in an inoperable position when said friction member is in a retracted position, said driving edge being movable from said inoperable position into an operable position wherein said driving edge is disposed between adjacent ones of said abutments in response to the displacement movement of said friction member in excess of a predetermined amount, said driving edge being movable from said operable position into driving engagement with one of said adjacent abutments in response to retractile movement of said friction member to rotate said flange means and thereby adjust the retracted position of said friction member.

9. In a friction device having a friction member for displacement and retractile movement between a retracted postion and a displaced position in frictional engagement with a coacting member, adjustment means including a rotatable flange member, and a strut adjustably coupled with said flange member and engaging said friction member, said flange member being movably supported in said friction device for concert movement with said friction member and engageable with a portion of said friction device to adjustably define the retracted position of said friction member, said flange member being rotatable relative to said strut for moving said strut axially relative to said flange member to adjust the retracted position of said friction member, said flange member including a peripheral surface, and a side wall portion having axially extending circumferentially spaced abutments, and adjustor means pivotally supported in said friction device and resiliently urged into engagement wtih said flange member for concert movement with said flange member, said adjustor means including a driving portion movable in substantially a single plane which intersects said side wall substantially chordwise of said flange member, said driving portion being drivingly engageable with said abutments for rotating said flange member to adjust the retracted position of said friction member, and abutment means on said adjustor means maintaining said driving portion in an inoperable position wherein said driving portion is spaced axially from said abutments and radially inwardly of said peripheral surface when said friction device is in a retracted position, said driving portion being movable from said inoperable position into an operable position wherein said driving portion is disposed between adjacent ones of said abutments in response to the displacement movement of said friction member in excess of a predetermined amount, said driving portion being movable from said operable position into driving engagement with one of said adjacent abutments in response to retractile movement of said friction member to rotate said flange member and thereby adjust the retracted position of said friction member.

10. In a friction device having a friction member for displacement and retractile movement between a retracted position and a displaced position in frictional engagement with a coacting member, adjustment means including a rotatable flange member engageable with a portion of said friction device and movably supported by said friction device for concert movement with said friction member, and a strut threadedly connected with said flange member and engaging said friction member to adjustably define the retracted position of friction member, said flange member being rotatable relative to said strut to effect axial movement of said strut relative to said flange member to adjust the retracted position of said friction member, said flange member including starwheel means having a plurality of generally radially extending circumferentially spaced teeth, adjustor means pivotally mounted to a fixed portion of said friction device, and resilient means urging said adjustor means toward engagement with said flange member, said adjustor means including a driving portion engageable with said teeth for rotating said flange member, and abutment means on said adjustor means normally urging said flange member in a direction toward said friction member, said driving portion being movable substantially in a single plane normal to the plane of said flange member and which intersects said starwheel means, said abutment means engaging said flange member to maintain said driving portion in an inoperable position axially spaced from said teeth when said fricton member is in a retracted position, said driving portion being movable into an operable position between adjacent ones of said teeth in response to displacement movement of said friction member in excess of a predetermined amount, said driving portion being movable from said operable position into driving engagement with one of said adjacent teeth in response to the retractile movement of said friction member to rotate said flange member and adjust the retracted position of said friction member.

11. An adjustment mechanism for controlling the retracted position of a movable member of a device having force producing means for moving said member from a retracted position to an extended position, and other force producing means for moving said member from the extended position to the retracted position, said mechanism comprising flange means engageable with a portion of said device, a strut threadedly connected with said flange means and engaging said movable member to define the retracted position thereof, said flange means and said strut being movable in concert with said movable member, said flange means being rotatable relative to said strut to effect movement of said strut relative to said flange means to adjust the retracted position of said movable member, said flange means having a plurality of circumferentially spaced axially extending abutments thereon, and adjustor means including a lever pivotally mounted to a fixed part of said device for movement in a plane which intersects the plane of said flange means substantially chordwise of said flange means, and resilient means urging said lever into following engagement with said flange means, said lever including a driving portion drivingly engageable with said abutments to rotate said flange means for adjusting the retracted position of said movable member, and spacer means on said lever normally urged into engagement with said flange means to maintain said driving portion in an inoperable position axially spaced from said abutments when said movable member is in the retracted position, said driving portion being movable into an operable position between adjacent ones of said abutments in response to movement of said movable member in excess of a predetermined amount from the retracted position to the extended position, said driving portion being movable from said operable position to drivingly engage one of said adjacent abutments in response to movement of said movable member from the extended position toward a retracted position to rotate said flange means and adjust the retracted position of said movable member, said driving portion being movable from driving engagement with said one abutment into said inoperable position in response to movement of said movable member into the retracted position.

12. In a friction device having a friction member for displacement and retractile movement between a retracted position and a displaced position in frictional engagement with a coacting member, adjustment means movably supported by said friction device for concert movement with said friction member and engageable with a portion of said friction device to adjustably define the retracted position of said friction member, said adjustment means including flange means rotatable to adjust the retracted position of said friction member, said flange means including a peripheral surface and a radially extending side wall portion having axially extending circumferentially spaced abutments, and adjustor means including a lever pivotally mounted on a fixed portion of said friction device for pivotal movement in a plane which intersects said side wall portion, said lever including a follower arm having a driving edge at one end thereof disposed radially inwardly of said peripheral surface and adapted for driving engagement with said abutments for rotating said flange means, and spacer means adjacent to said driving edge and extending from said arm toward said flange means, and resilient means connected to said arm adjacent to the opposite end thereof to normally urge said opposite end away from said flange means and said spacer means against said flange means, said spacer means engaging said side wall portion to maintain said driving edge axially spaced from said abutments in an inoperable position when said friction member is in a retracted position, said driving edge being movable from said inoperable position into an operable position wherein said driving edge is disposed between adjacent ones of said abutments in response to the displacement movement of said friction member in excess of a predetermined amount, said driving edge being movable from said operable position into driving engagement with one of said adjacent abutments in response to retractile movement of said friction member to rotate said flange means and thereby adjust the retracted position of said friction member.

13. In a friction device having a pair of relatively displaceable friction members, one of said friction members being adapted for displacement and retractile movement into and out of frictional engagement with the other of said friction members, extendable adjustment means engaged for concert displacement and retractile movement with said one friction member and defining the retracted position thereof including a wheel member movable in concert with said adjustment means and rotatable to control the extension of said adjustment means and adjust the retracted position of said one friction member, said wheel member including a side wall having radially extending spaced teeth, adjustor means pivotally supported on a fixed portion of said friction device, and resilient means normally urging said adjustor means into following engagement with said side wall to provide pivotal movement of said adjustor means in one and the opposite directions in response to displacement and retractile movements of said adjustment means, respectively, said adjustor means including driving means movable in only one plane and engageable with said teeth for rotating said wheel member, and abutment means engaging said side wall portion to maintain said driving means in an inoperable position out of engagement with any of said teeth and to restrain said wheel member against rotation when said one friction device is in a retracted position, said driving means being movable with said adjustor in said one direction into an operable position between two adjacent ones of said teeth in response to a predetermined amount of displacement movement of said adjustment means, said driving means being pivotal with said adjustor means in said opposite direction into driving engagement with one of said adjacent teeth in response to retractile movement of said adjustment means to rotate said wheel member and extend said adjustment means to adjust the retracted position of said one friction member.

14. In a friction device having a movable friction member, a coacting member, force producing means for displacing said friction member from a retracted position into frictional engagement with said coacting member, and resilient means connected to said friction member for retracting said friction member from frictional engagement with said coacting member into a retracted position, the combination therewith of adjustment means mounted in said friction device between said force producing means and said friction member for concert movement with said friction member for adjusting the retracted position of said friction member comprising an adjusting member engageable with a portion of said friction device, a non-rotatable strut threadedly coupled to said adjusting member and engaging said friction member to define the retracted position thereof, said adjusting member being rotatable to effect axial movement of said strut relative thereto to adjust the retracted position of said friction member, said adjusting member including an annular flange portion having a radially extending side wall and an irregular periphery adapted to be engaged by a tool for rotating said adjusting member for manually adjusting said adjustment means, and a plurality of circumferentially spaced radially extending teeth connected to said side wall, and adjustor means including a lever member pivotally mounted to a fixed part of said friction device for pivotal movement in substantially a single plane which is substantially normal to and intersects the plane of said side wall portion, said lever having a side edge facing said side wall and another side edge intersecting said first named side edge to define a driving portion disposed radially inwardly relative to said periphery and engageable with said teeth for rotating said adjusting member, and spacer means adjacent to said driving portion and extending axially from said first named side edge toward said side wall, and resilient means connected to said lever to normally urge said spacer means toward engagement with said side wall, said spacer means engaging said side wall to maintain said driving portion in an inoperable position axially spaced from said teeth when said friction member is in a retracted position, said driving portion being movable in one direction from said inoperable position into an operable position wherein said driving portion is disposed between adjacent ones of said teeth in response to the displacement movement of said friction member in excess of a predetermined amount, said driving portion being movable in the opposite direction from said operable position into driving engagement with one of said adjacent teeth in response to retractile movement of said friction member to rotate said adjusting member and thereby adjust the retracted position of said friction member, said driving portion being movable from driving engagement with said one tooth into said inoperable position in response to movement of said friction member into a retracted position.

15. In a friction device having a friction member for displacement and retractile movement between a retracted position and a displaced position in frictional engagement with a coacting member, adjustment means movably supported by said friction device and engaged for concerted movement with said friction member and engageable with a portion of said friction device to adjustably define the retracted position of said friction member, said adjustment means including flange means rotatable relative to said friction member to adjust the retracted position thereof, said flange means having a plurality of spaced abutment surfaces thereon and opposed radial side walls, and resiliently urged means pivotally movable about a fixed axis on a stationary portion of said friction device and urged toward engagement with said flange means for concerted movement in opposite directions therewith, said resiliently urged means including a driving portion movable in only one plane and drivingly engageable with said abutment surfaces, said one plane intersecting said side walls of said flange means, said resiliently urged means being pivotally movable in one direction in response to displacement movement of said friction member in excess of a predetermined amount to move said driving portion into an operable position between adjacent ones of said abutment surfaces and being pivotally movable in the opposite direction in response to retractile movement of said friction member to move said driving portion from said operable position into driving engagement with one of said adjacent abutment surfaces to effect rotation of said flange means.

16. The combination according to claim 15, wherein said resiliently urged means is entirely substantially flat and has an outer peripheral surface and opposed substantially plane opposed sides intersecting said peripheral surface.

17. The combination according to claim 15, wherein said resiliently urged means includes means engaging said flange means to maintain said driving portion axially spaced from said abutment surfaces when said friction member is in the retracted position.

References Cited by the Examiner
UNITED STATES PATENTS

| 1,971,643 | 8/1934 | De Lavaud | 188—79.5 |
| 2,669,327 | 2/1954 | Chamberlain et al. | 188—79.5 X |
| 3,169,610 | 2/1965 | Gold | 188—196 X |
| 3,209,866 | 10/1965 | Ullrich | 188—196 X |

DUANE A. REGER, *Primary Examiner.*